UNITED STATES PATENT OFFICE.

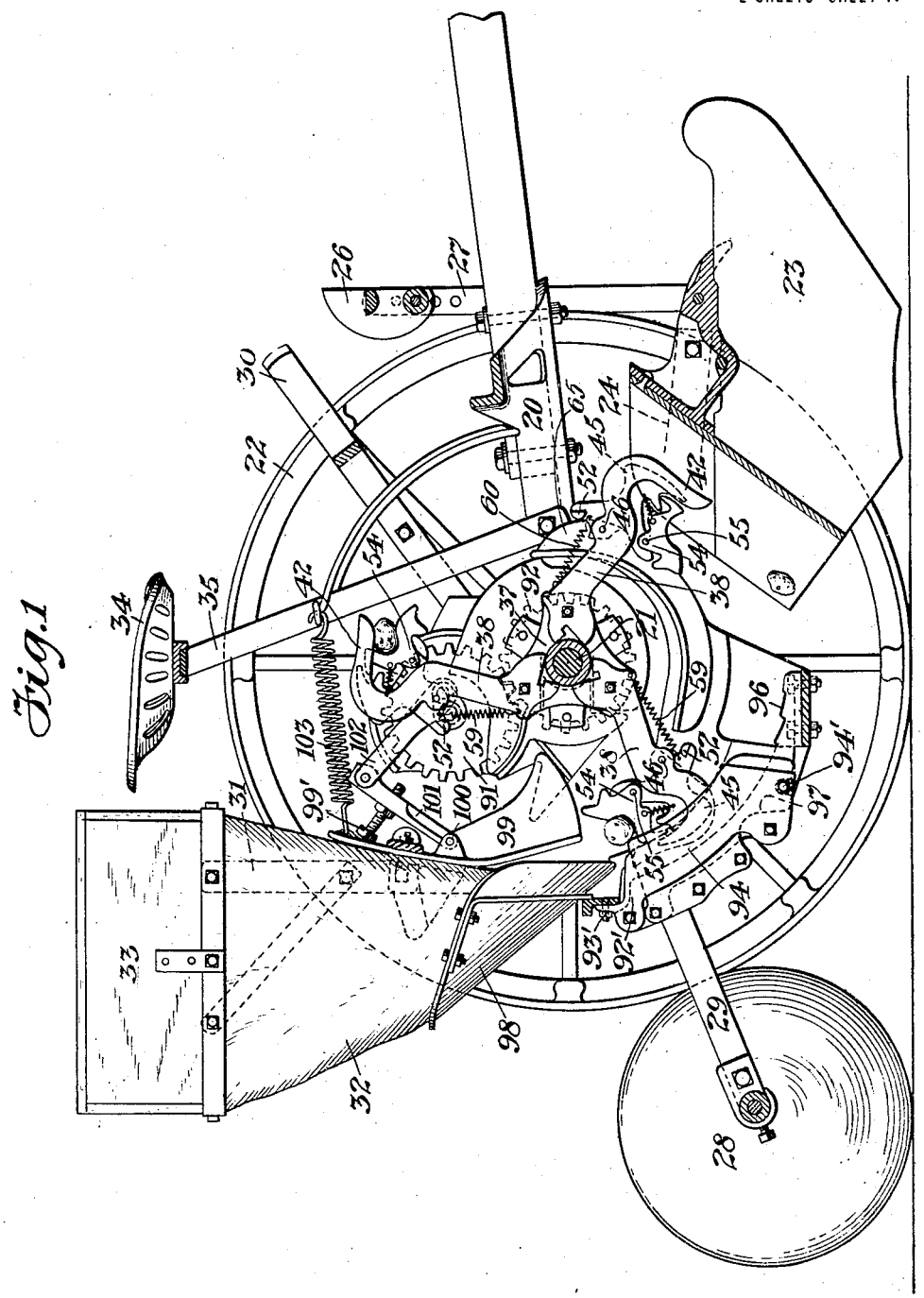

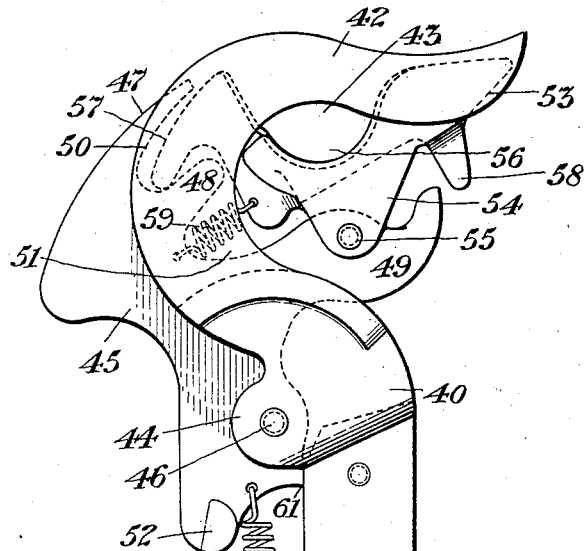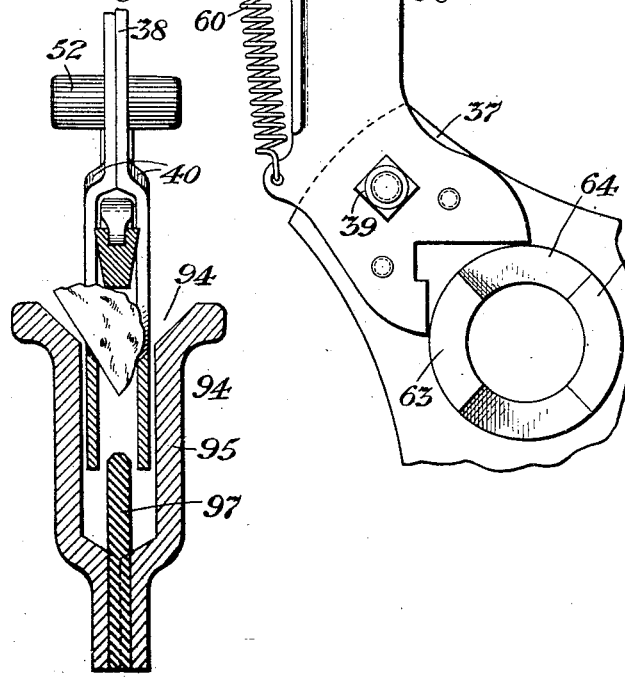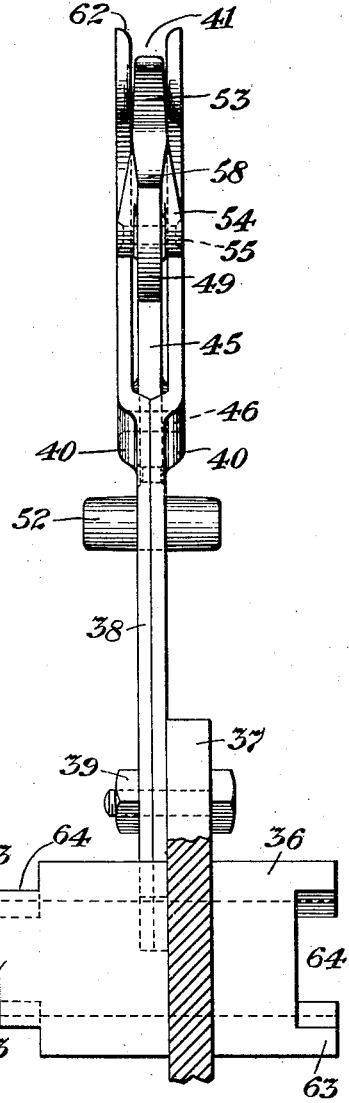

LEWIS AUGUSTUS ASPINWALL, OF JACKSON, MICHIGAN, ASSIGNOR TO ASPINWALL MANUFACTURING COMPANY, A CORPORATION OF MICHIGAN.

POTATO-PLANTER.

1,240,529.  Specification of Letters Patent.  Patented Sept. 18, 1917.

Application filed August 25, 1916.  Serial No. 116,795.

*To all whom it may concern:*

Be it known that I, LEWIS AUGUSTUS ASPINWALL, a citizen of the United States, residing at Jackson, in the county of Jackson and State of Michigan, have invented an Improvement in Potato-Planters, of which the following is a specification.

This invention relates to a potato planter and more particularly to the improved construction of the picker devices, and the concaves with which the pickers coöperate to engage, to grip, convey and discharge the potatoes in the planting operation including the mechanism by which the pickers are driven.

In potato planters as heretofore commonly constructed, picker points or prongs have been employed to pierce the potatoes and a trip mechanism used to remove the potatoes from the prongs, the distance in planting varying with the speed at which the planter was operated, the weight and size of the potato, and the depth of the puncture made by the prong.

In my present invention, the picker is so constructed that irrespective of the speed with which the machine is operated, the size and weight of the potato, the potato seed is seized, engaged and carried by a yieldingly constructed gripper jaw and released at the proper time, so that the placing of the potatoes in the furrow is entirely uniform.

I am aware that heretofore various devices have been suggested for handling the potatoes in somewhat similar manner, for example, in Letters Patent No. 891730, granted June 23rd, 1908, to Pugh, for a potato planter, there is shown and described a picker device comprising a jaw having a fixed member and a yielding movable member between which the potatoes are seized, gripped and released for planting.

My present invention is an improvement upon this form of picker, and so far as this part of the machine is concerned, relates particularly to the provision of a tongue member yieldingly connected to a movable member mounted in the end of the picker arm and adapted to coact with the same, as hereinafter described, to engage the potatoes to be planted in such a manner as to contact with the same at substantially three points and with sufficient resiliency, and at the same time with the required pressure, to yieldingly grip the potato without in any way bruising the same.

My present invention also relates to an improved form of concave, and the manner in which the same is secured in the machine. In my former machines, as disclosd in various Letters Patent granted to me, the concaves were made with an increased pitch toward the center which necessarily brought undue pressure upon the potatoes nearest the pivotal point at which the concave was mounted in the machine, oftentimes causing a pressure sufficient to bruise the potatoes; whereas in my present invention, the concave is made on a circle which is concentric with the axis of the planter. The concave is pivotally mounted in a concave frame and may be normally held in position so as to yield should an exceptionally large potato be among the seed. This obviates all undue pressure and friction, and as hereinafter described, the concave is provided with a ratcheted or stepped bottom to prevent the escape of the potatoes through the picker channel in the frame.

All of these improvements will be hereinafter more particularly described in connection with the drawings, in which:

Figure 1 is an elevation and partial section illustrating my improved planter taken at one side of the machine.

Fig. 2 is an enlarged side elevation of the picker arm and improved picker, attached to the picker head, in two parts clutched together with a slight lateral movement which affords perfect alinement in each set of pickers.

Fig. 3 is an edge view of the same, and

Fig. 4 is an elevation and partial cross section illustrating the concave and the manner in which a potato is engaged therein by the picker.

In the drawing, 20 represents the frame of the potato planter, and may be made in any approved manner. Suitably mounted in the frame 20 is an axle 21, on which there are drive wheels 22. In this construction the axle 21 is preferably fixed in the frame 20 and the drive wheels 22 mounted to turn on the axle. 23 indicates the plow which as is customary is secured to a plow bar 24 pivotally mounted in the frame of the planter and provided with a lifting handle 26 and handle bar 27 by means of which the plow 23 may be raised and lowered to and from its inoperative and operative positions.

I also employ a set of coverers 28, two in number, one at either side of the machine and each mounted on a coverer bar 29 which may be actuated by a foot lever 30 to raise the coverers from their operative positions when not employed in covering the furrows opened by the plow. I also employ suitable standards 31 fixed in any desired manner in the frame of the machine to support a flexible hopper 32 and a rigid receptacle 33 mounted above the hopper for receiving and containing the potatoes to be planted, and from which they are fed, to the concave hereinafter described.

I also employ a seat 34 for a driver, and this as is customary, is secured at the upper end to a seat standard 35, suitably fixed in the frame of the planter.

All of the hereinbefore described parts are similar or substantially equivalent to like parts heretofore shown and described in the Letters Patent granted to me for potato planters.

In carrying out this invention, the pickers are preferably in sets of three each, as has for sometime heretofore been the custom in my potato planter practice, and each set of pickers is secured to a picker head mounted loosely on the axle 21. Each picker head comprises a sleeve 36 provided with flanges 37 to which the shanks 38 of the picker arms are secured by bolts 39 or otherwise.

As illustrated in the drawing, each picker arm is preferably made in two parts which are riveted or otherwise secured together. In suitable positions the parts of each picker arm are offset as indicated at 40 so as to provide a space 41 between the end parts of each picker arm. The extremities of these parts are indicated at 42 and are provided with depressions 43 for a purpose hereinafter described. Each picker arm is also provided with lugs 44, between which so as to fit within the space 41 is a swinging member 45. This is pivotally mounted in the lugs 44, as indicated at 46, and adjacent its opposite end is provided with projections 47, 48, and 49, with the intervening recesses 50 and 51. On the opposite side of its pivotal point, each swinging picker member is also provided with lugs indicated at 52.

Associated with each picker arm and pivotally connected to its swinging picker member 45 is a tongue 53. Each tongue 53 is provided on one side with spaced lugs adapted to span the projection 49 of the corresponding swinging member to which it is pivoted as indicated at 55. Opposite its pivoted point, each tongue is provided with a depression 56 for coöperating with the depression 43, and also the convex portions of the ends of the picker arm, to engage, carry and release a potato, and each tongue 53 is also provided with projections 57 and 58, the former entering the recess 50 in the swinging picker member 45 and the latter coöperating with the projections 49 to limit the forward swinging movement of the tongue 53 which is normally maintained in position with the projection 57 contacting against the projection 48 by means of a spring 59. This construction may be varied for example by shortening the inner end of the tongue 53 so that it will pass under a plain end in the swinging member 45. The swinging picker member 45 is normally maintained in position by a spring 60 extending between the same and a suitable point on the picker arm, and this position is determined by the stops 61 on the swinging picker member 45, which bear against the adjacent surface of the corresponding picker arm. All of these parts are clearly illustrated in Figs. 2 and 3.

As is also clearly indicated in Fig. 3, the inner edges 42 of the picker arms are beveled at 62 to correspond with the beveled edges of the concave whereby the arms move under and receive the potatoes in the forward movement of the pickers, as hereinafter described, and also as indicated in Figs. 2 and 3, the sleeves 36 of the picker heads are provided with projections 63 and intervening recesses 64, in order to engage a drive gear on the one hand and another picker head on the other hand so that these parts may have a slightly lateral movement on the axle, to insure the proper coöperation between the pickers and the concave with which they co-act. I also provide cam members 65 suitably secured in the frame of the planter and adapted to engage the lugs 52 in order to move the swinging member against the action of the spring 60 to open the jaws between the ends of the picker arm and the tongue, as hereinafter described.

As hereinbefore stated, my present invention also includes an improved form of concave. This concave comprises a shell or outer member 92' bolted to the frame of the planter as indicated at 93' and an inner member 94 pivotally mounted in the outer member on a bolt 94' and normally held in position by its own weight. The concave member 94 is slotted in its lower edge to receive the bolt 94' and thus is readily removable from the shell. The walls 95 of the concave 94 as clearly indicated in Fig. 4, are spaced an appreciable distance apart, sufficiently far to permit the free entrance of the ends of the picker arms, and also as indicated in this figure, the upper portions of the concave wall are flanged and beveled. Midway between the walls 95 is a center piece 97 which is ratcheted or stepped at its lower end as indicated at 96 to prevent the passage of small potatoes through the spaces for the pickers. Above the ratcheted end this center piece 97 serves to prevent the potatoes from passing through the concave.

In Fig. 4 is also illustrated the manner in which a partial or cut potato is gripped in the jaws of the picker, and it will be readily understood that if a part or piece of potato is so readily grasped and maintained in position, that a whole potato irrespective of its size, will be handled by the picker much more readily.

In my present potato planter the mechanism for operating the feed gate by which the potatoes are admitted to the concave from the flexible hopper, and as shown in Fig. 1, includes a chute 98 inclosing the lower ends of the flexible hopper and leading from the same to the concave. The feed gate is indicated at 99 and is pivotally mounted in the frame at 100. One end of an arm 101 is also pivotally mounted at the pivotal point 100, while the opposite end of this arm 101 is connected to one end of a link 102 the opposite end of which is connected to the hub of a gear wheel 91 by a crank pin. The gear wheel 91 is driven from a gear wheel 92 which is driven from the axle or from the drive wheels of the apparatus. The arm 101 is provided with an adjustable bolt 99′ against which the feed gate is held by means of a spring 103, so that as the arm 101 swings forward the gate is closed by the spring 103 whereas when the arm moves back the gate is opened by the contact with the adjustable bolt 99′ the position of which determines the extent to which the gate is opened.

In the operation of the hereinbefore described potato planter, the hoppers having been filled with potatoes to be planted and the plow and coverer disks lowered to their operative positions, the sleeve 36 is connected to its actuating devices to operate the pickers.

As each picker head travels around the axle, and before reaching the concave, the lugs 52 come into contact with the cams 65 thereby moving the swinging member 45 on its pivotal point against the action of the spring 60. This opens the jaws of the picker without changing the relationship between the swinging member 45 and the tongue 53; in this position, each picker is carried into and through the concave and when in the concave moves under a potato or piece of potato on the beveled inner edges of the concave and receives the same, so that when the lugs 52 run off the cams 65, the action of the spring 60 returns the swinging member 45 toward its initial position, permitting the tongue to engage a potato in the recessed side thereof against the action of the spring 59, the potato being held in the paws of the picker within the recesses 43, 56, so that there are substantially but three points of contact, one against the tongue 53, and two against the ends of the picker arms. This double yielding contact is sufficient to maintain the potato in position in the picker without in any way bruising or injuring the same until the picker arm again reaches the position in which the lugs 52 run on to the cams 65, in which, as will be understood, the same operation is repeated and the potato released from the jaws and dropped into the furrow without the assistance of any device whatsoever.

I claim as my invention:

1. In a potato planter, a picker comprising a pair of spaced arms having beveled edges adapted to receive a potato, a device associated with said spaced arms and co-acting therewith to engage, hold and release a potato, and a concave member to which the potatoes are fed and from which the potatoes gravitate to the said spaced arms, and which is adapted to permit the passage therein of said spaced arms and a potato held against the same by the action of the said device.

2. In a potato planter, a picker comprising a pair of spaced arms having beveled inner edges adapted to receive a potato, a concave, a center piece in the concave, the potatoes being fed to the concave and prevented from passing therethrough by the said center piece, and means associated with said spaced arms and coacting therewith to engage, hold, and release a potato.

3. In a potato planter, picker devices for receiving and carrying a potato, means for actuating the said picker devices to cause the same to yieldingly engage, hold and then release a potato, a concave to which said potatoes gravitate and through which said picker devices pass, and a center piece in said concave spanned by parts of the picker devices in passing through the concave and acting as a stop to prevent the passage of potatoes through the concave.

4. In a potato planter, a picker comprising a pair of spaced arms, a device between said spaced arms, means for actuating the said device between the spaced arms for causing the same to co-act with the said spaced arms to engage, hold and release a potato, and a concave member having spaced walls to permit the passage therethrough of the said spaced arms and a potato held against the same by the action of the said device.

5. In a potato planter, a picker comprising a pair of spaced arms having beveled edges, a tongue pivotally mounted between the said spaced arms, means for actuating the said tongue for causing the same to cooperate with the said spaced arms to engage, hold and release a potato, and a concave, the walls of which are spaced appreciably apart to permit the passage therethrough of the said spaced arms and a potato held against the same by the action of the said tongue, the edges of the walls of the concave being beveled similarly to the edges of the spaced arms.

6. In a potato planter and in combination, a frame, a plurality of pickers, means for actuating the said pickers, a concave shell fixed in the said frame, and a concave member adapted to permit the passage therethrough of said pickers and having slotted ends by which it is pivotally mounted in the said concave shell and independently removable therefrom.

7. In a potato planter, and in combination, a frame, a plurality of pickers, means for actuating the same, a concave shell fixed in said frame, a bolt passing therethrough, a concave member having a slot therein to receive the said bolt in order to pivotally and removably mount the said concave member in the concave shell, and means for preventing the passage of the potatoes through the said concave member.

8. In a potato planter and in combination, a frame, a plurality of pickers, means for actuating the same, a concave shell fixed in said frame, a bolt passing therethrough, a concave member having a slot therein to receive the said bolt in order to pivotally and removably mount the said concave member in the concave shell, and a center piece within the said concave member the walls of which are appreciably spaced so as to leave picker spaces between the same and the said center piece, which center piece acts to prevent the passage of the potatoes through the concave member and the lower forward end of which is ratcheted to prevent the passage of the potatoes through the picker spaces.

9. In a potato planter and in combination, a concave having walls appreciably spaced apart, and a picker mechanism comprising spaced arms adapted to pass between the walls of the concave, and pivoted devices operating between said spaced arms and coacting therewith to positively and yieldingly engage and hold a potato or a part thereof and then release the same.

10. In a potato planter and in combination, a concave shell, a concave member pivotally and removably mounted therein and having walls spaced an appreciable distance apart, and a picker mechanism comprising spaced arms adapted to pass between the walls of the concave, and devices pivotally mounted and operating between said spaced arms and coacting therewith to positively and yieldingly engage and hold a potato or a part thereof and then release the same.

11. In a potato planter and in combination, a frame, a concave shell secured in said frame, a concave member pivotally and removably mounted in said concave shell and having therein a center piece, the walls of the concave member being spaced an appreciable distance apart and beveled at their outer edges, and a picker mechanism comprising spaced arms, and devices pivotally mounted and operating between said spaced arms and coacting therewith to positively and yieldingly engage and hold a potato or a part thereof and then release the same, the edges of the said spaced arms being beveled to correspond with the beveled edges of the walls of the concave.

12. In a potato planter and in combination, a concave member having walls spaced an appreciable distance apart, and a picker mechanism comprising spaced arms adapted to pass between the walls of the concave member, a gripper tongue, means for pivotally mounting and actuating the gripper tongue between the said spaced arms so that the same coacts therewith to positively and yieldingly engage and hold a potato or a part thereof and then release the same.

13. In a potato planter and in combination, a concave shell, a concave member pivotally and removably mounted within the said concave shell and having walls spaced an appreciable distance apart, and a picker mechanism comprising spaced arms, a swinging member pivoted between the said spaced arms, and a gripper tongue pivotally mounted in the said swinging member and adapted to be actuated thereby to coact with the spaced arms to positively and yieldingly engage and hold a potato or a part thereof and then release the same.

14. In a potato planter and in combination, a frame, a concave shell fixed in said frame, a concave member pivotally and removably mounted in said concave shell and having a center piece therein with its lower end ratcheted, the walls of the said concave member being spaced an appreciable distance apart and beveled at their outer edges, and a gripper mechanism comprising spaced arms, a swinging member pivotally mounted between said spaced arms, means for normally maintaining the said swinging member in an initial position, a gripper tongue pvotally mounted in said swinging member, means for yieldingly maintaining the said gripper tongue in an initial position relatively to the swinging member, and means for operating the said swinging member and gripper tongue causing the same to coöperate with the said spaced arms and the said concave member to positively and yieldingly engage and hold a potato or a part thereof and then release the same, the edges of the said spaced arms being beveled to correspond with the beveled outer edges of the walls of the said concave member.

Signed by me this 21st day of August, 1916.

LEWIS AUGUSTUS ASPINWALL.

Copies of this patent may be obtained for five cents each, by addressing the "Commissioner of Patents, Washington, D. C."